United States Patent [19]

Zani et al.

[11] Patent Number: 4,943,104
[45] Date of Patent: Jul. 24, 1990

[54] OPENING AND CLOSING CONTROLS OF ROOFS FOR VEHICLES

[75] Inventors: Bruno Zani; Duilio Zani, both of Lumezzane, Italy

[73] Assignee: Zani S.r.l., Brescia, Italy

[21] Appl. No.: 246,515

[22] Filed: Sep. 19, 1988

[30] Foreign Application Priority Data

Sep. 25, 1987 [IT] Italy .................................. 2935 A/87
Apr. 8, 1988 [IT] Italy .................................. 2925 A/88

[51] Int. Cl.⁵ .............................................. B60J 7/10
[52] U.S. Cl. ...................................... 296/223; 49/341; 292/263
[58] Field of Search .................. 296/216, 223; 49/345, 49/340, 341, 342, 343; 292/263

[56] References Cited

U.S. PATENT DOCUMENTS

| | | | |
|---|---|---|---|
| 2,894,295 | 7/1959 | Sigleton | 292/263 |
| 3,508,362 | 4/1970 | Wright | 49/341 |
| 4,257,632 | 3/1981 | DeStepheno | 292/263 |

FOREIGN PATENT DOCUMENTS

2059500  4/1981  United Kingdom ................ 296/223

*Primary Examiner*—Robert R. Song
*Attorney, Agent, or Firm*—Bucknam and Archer

[57] ABSTRACT

A worm screw (1), controlled in rotation by a knob (2) or a reduction gear, is coupled to two helical gears (3) to which are stiffly connected primary levers (6) or (6'), which, through end supports (9), form an articulated pantograph structure with an equal number of secondary levers (10) or (10') whose ends are linked to pins (12) fixed on the roofs (13) of vehicles.

13 Claims, 3 Drawing Sheets

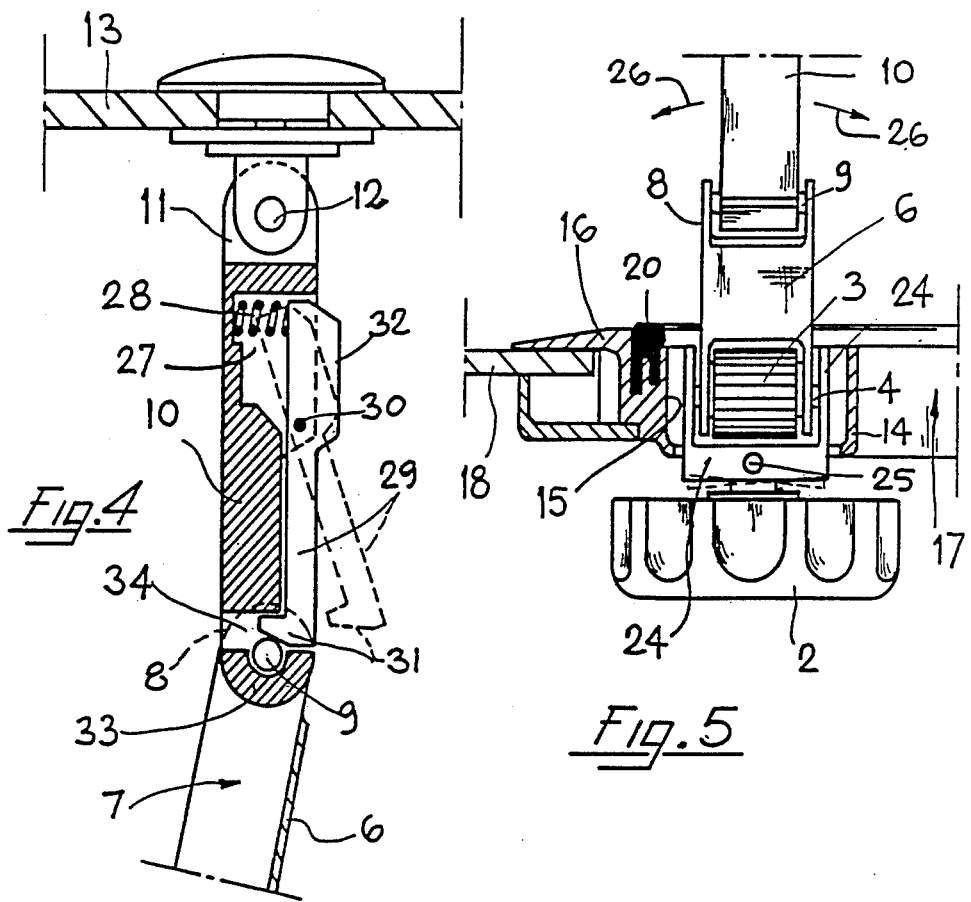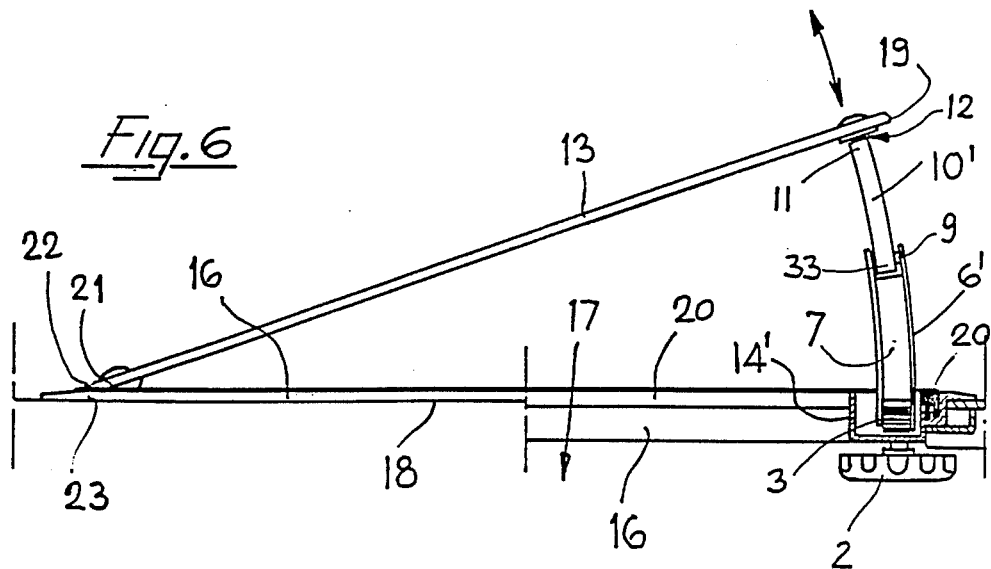

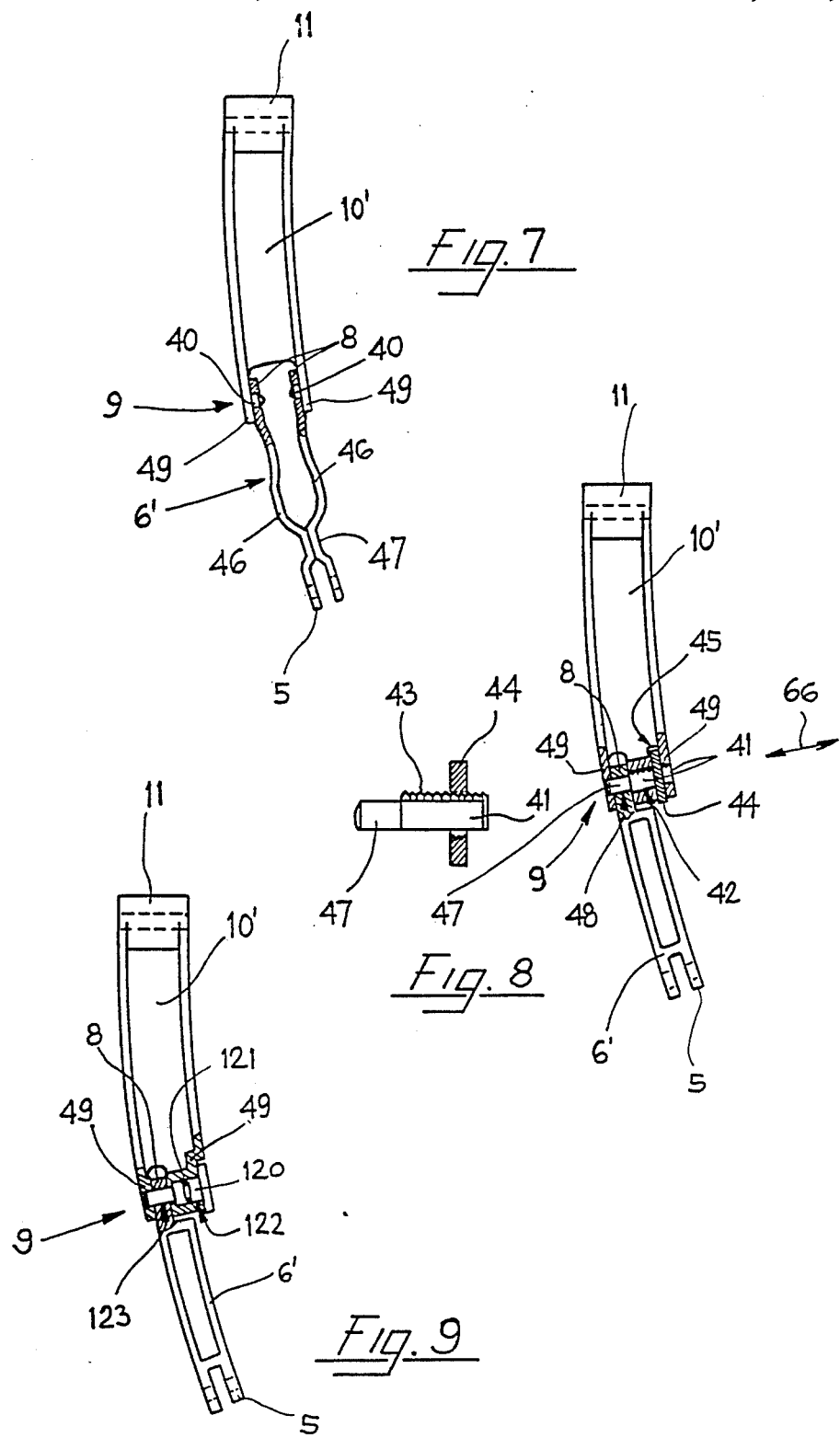

OPENING AND CLOSING CONTROLS OF ROOFS FOR VEHICLES

The invention relates to an opening and closing control device of roofs for vehicles in general comprising substantially a manual knob, or a motorized means, coaxial and integral to a worm screw coupled to two opposite helical gears, on the axes of rotation of which are fixed the end of two levers which form, together with two other levers supported at the opposite ends, a double pantograph-articulated movement, the two opposite ends of which are supported to pins fixed to the plane of a movable roof. The knob with screw and the gears instead are positioned in a seat linked or integral to the fixed part of the roofs of the vehicles. Among accessories or options for vehicles in general, opening roofs are becoming increasingly popular, through which users can enjoy greater air circulation, in summer, avoiding the annoying flows and noise caused by the opening of windows. The numerous products at present on sale are equipped with an equal number of opening and closing controls, more or less effective, more or less convenient and more or less economical in manufacturing.

Among these, the simplest controls are those with snap-handle through which the roofs, hinged along their front transversal side, open from the rear part, being able to take up different, pre-established intermediate positions.

These controls, while operative from the functional point of view, present the problem of offering a fairly limited maximum opening.

Other types of controls provide the use of foldaway or nonfoldaway rotating handles, which drive winding pulleys for metal cables or similar, or cog-wheels, or screws or toothed flexible sectors, which, while permitting a better opening of the roofs, compared to the types previously described, cannot surpass certain opening limits and basically consist of rather complex structures, difficult to assemble and dismantle and consequently rather expensive.

Another problem found in many types of controls at present on the market consists of the fact that the shape and size of the components of these controls are not suitably limited and shaped to reduce to a minimum the risk of injury to users in case of impact or accidents.

The object of this invention is to eliminate the above problems. The invention, solves the problem by means of an opening and closing control for car roofs, through which the following results are obtained: the roofs are opened and closed by means of the extension and return of two pairs of levers with articulated movement, obtained by coupling helical gears with a worm screw, which is made rotate by a knob or small electric motor; the movement members and opening levers are located in a container of reduced size located in the opening perimeter of the roof; the knob or control motor are of limited size, connected and slightly projecting.

The advantages of this invention mainly consist of the fact that the parts forming the control are simple, inexpensive, easy to apply and dismantle, easy to manoeuvre and safe to operate; the possibility of opening the roofs if indisputably superior and not comparable with present models, as they are function of the levers with articulated movement or pantograph, which, being positioned in closure along the rear transversal side of the roofs and being hidden by the peripheral frames, may have a considerable extension.

Another advantage is that the size, position and shape of the components of the control mechanism and knob, or the small electric motor, do not represent dangerous forms for the users of the vehicles.

The invention is described in detail below with the help of the following drawings, in which.

Figure 1:
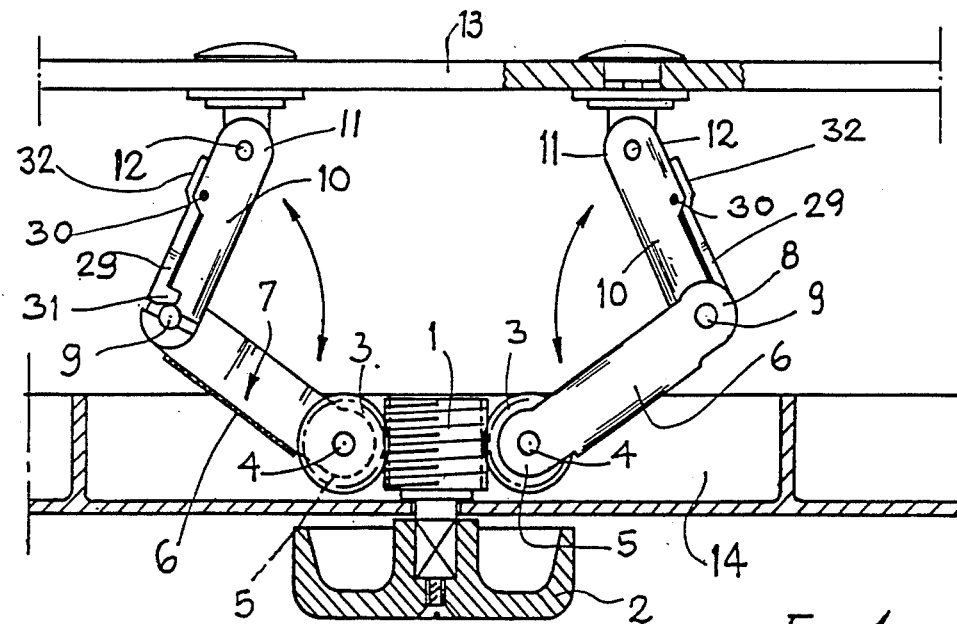
FIG. 1 shows a longitudinal cross-section of the control
Figure 2:
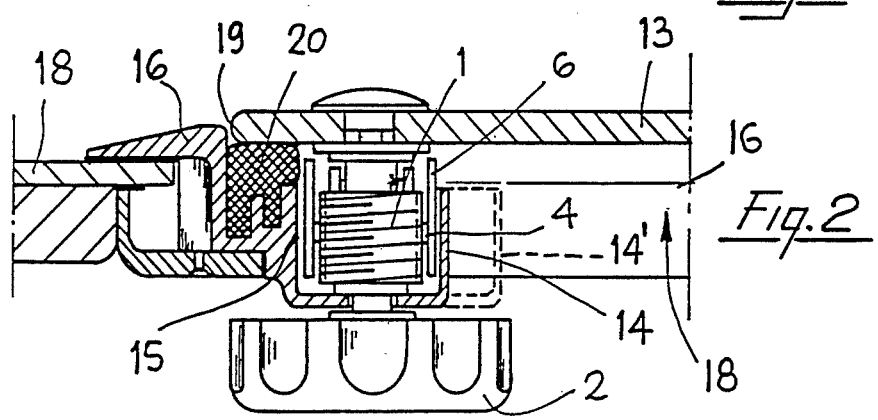
FIG. 2 shows a cross-section of the same control
Figure 3:
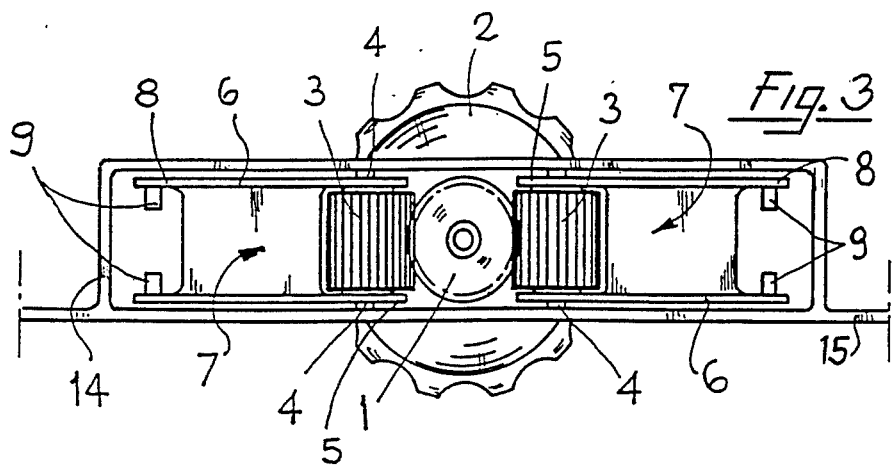
FIG. 3 shows a partial section-view from the top of the control

FIG. 4 is a section-view of one of the upper levers of the structure with articulated movement FIG. 5 shows a first construction of the control applied on a swinging slide FIG. 6 shows a second construction of the control with the levers of articulated movement, shaped according to an opening radius of the roof, hinged to the opposite end FIG. 7 shows a side view of two control levers coupled by means of flexible ends FIG. 8 shows a side view of two control levers coupled by means of threaded ring nut, and FIG. 9 shows a side view of two control levers coupled by means of pressure-pins.

The figures show an opening and closing control for car roofs, mainly comprising a worm screw (1) with vertical axis, manually operated with a knob (2) or small electric motor with suitable reduction gear, to which are coupled two helical gears (3), with opposite diameters, and with parallel horizontal axes (4)

On these axes (4), and therefore on the sides of the gears (3) are fixed the ends (5) of the primary levers (6), preferably hollow in their central part (7).

The upper ends (8) of the primary levers (6) are fitted with small projecting pins (9) on which are supported the lower ends of the secondary levers (10), which, in turn, present their upper ends (11) supported on pins (12) applied to the roofs (13) of the vehicles.

The worm screw-helical gears assembly is inserted in a container (14) integral or fixed to the interior edge (15) of a frame (16) forming the peripheral border of the opening (17) made in the roof (18) of a vehicle.

The primary levers (6) and secondary levers (10) make an articulated pantograph movement to raise and lower the fixed rear transverse edge (19) of the frames (13) with respect to the fixed edge (15) of the frame (16). In the movement, the roofs (13) rotate around hinges (21) constructed between their movable front transversal edges (22) and the fixed ones (23) of the underlying frames (16). Suitable seal gaskets (20) are positioned between these elements.

In the closing conditions of the roofs (13), the primary levers (6) take up a substantially horizontal position, containing in their interior hollow portion (7) the corresponding secondary levers (10) which take up a similar position. The described solution, comprising the primary levers (6) with hollow portions (7), designed to contain the secondary levers (10), does not, however, exclude the possibility of reverse construction; in other words, it does not exclude the possibility of the secondary levers (10) containing, in closure, the primary levers (6).

The assembly of the articulated movement, or pantograph structure, formed by the abovementioned levers (6) and (10), is contained in the container (14), together with the helical gears (3) and worm screw (1), while the roofs (13) rest on the peripheral gaskets (20).

A suitable pull, made with rotation of the knob (2), guarantees a perfect seal between the roofs (13) and baskets (20). The opening condition is obtained by rotating the knob (2) in opposite direction: the worm screw (1) makes the helical gears (3) rotate in such a way that the primary levers fixed to them are raised from their horizontal rest position. In the movement, the primary levers (6) press the supports (9), starting the upper levers (10) moving, which, being pivoted to the upper pins (12) on which they are supported, rotate and rise.

The total extension of the articulated movement, i.e. of the pantograph structure formed by the levers (6) and (10), is obtained when they are substantially aligned to each other. Any intermediate opening position of the roofs (13) is possible because the worm screw (1) - helical gears (3) coupling is always stable.

Due to the fact that the opening and closing of the roofs (13) take place with their rotation around hinges (21), the control device must be able to follow and assist the circumferential path followed by the pins (12), to which the upper ends (11) of the secondary levers (10) are fixed and supported.

According to the first embodiment, the control devices (comprising the knob (2), the worm screw (1), the helical gears (3) and the related primary levers (6)) mounted to an intermediate bracket (24) fitted with two end pins (25) inserted in special seats, with possibility of rotating, constructed on the base of the container (14). As illustrated in FIG. 5, during manoeuvres, the entire control unit can therefore swing in one direction or the other, absorbing the circumferentail flow of the movement, as indicated by the arrows (26).

In another alternative embodiment, all control means remain in their position during all manoeuvres and circumferential rotation is assisted, constructing the primary levers (6') and secondary levers (10') with a curve with radius equal to the distance between the hinges (21) and pins (12) of the roofs (13). This is specifically illustrated in FIG. 6. However, to guarantee exact positioning of the primary levers (6') in the closing condition, with insertion in them of the secondary levers (10'), the basic container (14') is constructed slightly wider to contain the curved components. FIG. 4 shows in detail a first example of the coupling device which makes the connecting manoeuvres of the secondary levers (10) and 10') with the primary levers (6) and (6') easy and rapid.

In the illustrated example, the secondary levers (10) and (10') are constructed with internal seats (27) in which are inserted pressure-springs (28) which contain small levers (29), rotating round supports (30) and provided with wedge-shaped ends (31).

For the connection, it is sufficient to press the ends (32) of the small levers (29) until they permit insertion of the small projecting pins (9), of the primary levers (6) or (6'), in the lower brackets (33); with the subsequent release of the ends (32), the small levers (29) are thrust into their usual position by the small pressure-springs (28), while the wedge-shaped ends (31) are engaged in the grooves (34), preventing exit of the pins (9).

By repressing the ends (32), the small levers (29) are raised rotating round the supports (30), the wedges (31) are removed from the grooves (34) and the pins (9) can be easily exracted. The same devices can be applied alternatively also on the primary levers (6) or (6').

In another alternative embodiment the control knob (2) can be replaced by a reduction gear, while, varying the length of the primary and secondary levers, it is possible to vary the maximum opening of the roofs (13), being able to reach, in aggravated conditions, a size approximately half the width of said roofs. This is due to the fact that the container (14) of the levers is positioned near and along the fixed rear transversal edge (15) of the frames (16) and can develop for its entire length.

Single or double flexible elastic means can be adopted to cover the levers (6) or (6') and (10) or (10'), in extension conditions.

The present control, besides being applicable to roofs (13), structurally designed as car roofs, i.e. suitable for second assembly application on vehicles constructed without opening roof, can also be used for first assembly structures for vehicles already provided by manufacturers with this option. Other alternative embodiments for the construction of the primary levers (6) or (6') and secondary levers (10) or (10') and the relevant means of intermediate connection, are illustrated in FIGS. 7, 8 and 9.

In these embodiments, with reference to what has been previously illustrated, the upper ends (11) of the secondary levers (10) or (10') and the lower ends (5) of the primary levers (6) or (6') are, by way of example, respectively connected to the coupling pins (12) projecting from the surfaces of the opening roofs (13) and to the helical gears (3) engaged in the helical screw (1) coaxial to the control knob (2). However, this does not exclude the possibility that the coupling of these parts is made in reverse, i.e. the upper ends (11) can be connected to the helical control gear (3) and the lower ends (5) can be connected to the coupling pins (12) to the roofs (13), with the connections shown in the drawings reversed.

In the examples considered, the intermediate support (9), around which levers (10) or (10') and (6) or (6') rotate during the stretching or opening movements and the return or closing movements, according to a first embodiment is obtained exploiting the elasticity of the material with which the primary lever (6) or (6') is formed.

The primary lever (6) or (6') is, in fact, obtained by coupling two shaped arms (46), aligned to take up a horse-shoe conformation, and connected at an intermediate point (47). In a preferred solution the shaped arms (46) are obtained from sheets of steel for springs, elec-trowelded at the point (47).

Thanks to the intrinsic elasticity of the material, the two shaped arms (46) are easily deformable by hand, so the two upper ends (8), from their normal static position, can be brought close to each other then return elastically to their static position when manual pressure is released.

In conditions of deformation, the upper ends (8) can be inserted between the lower ends (49) of the secondary levers (10) or (10'), or are extractable from them.

In the first case, with subsequent release of the shaped arms (46), the small opposite pins (40), projecting from the inside surfaces facing the lower ends (49), of the secondary levers (10) or (10'), are engaged in an equal number of through-holes present on the upper ends (8) of the arms (46) forming the primary levers (6) or (6').

In the second case, bringing the upper ends (8) of the arms (46) near each other, the small pins (40) are freed from the holes and the levers (10) or (10') and (6) or (6')

separate. The small pins (40), engaged in the respective holes, form the support (9) around which the above-mentioned levers (10) or (10') and (6) or (6') can rotate.

In a second embodiment, the support (9) is formed by a transversal pin (41), guided along a hollow body (42) located at the lower end (49) of the secondary levers (10) or (10'). The transversal pin (41) is provided with a threaded edge (43) on which is engaged a ring nut (44) inserted in a slit (45), also located on the lower edge of the lever (10) or (10'). Making the ring nut, laterally engaged in the slit (45), rotate, the pin (41) with threaded edge (43) is dragged by the thread and forced to move crosswise according to the direction of rotation of the ring nut (44), in the direction of the arrows (66).

In the movement, the front end (47) of the transversal pin (41) is engaged in the holes (48) present on the upper part (8) of the primary levers (6) or (6'), or freed from it. The front end (47) of the transverse pin (41), engaged in a hole (48), forms the support (9) around which the coupled levers (10) or (10') and (6) or (6') rotate.

In a third embodiment, the support (9) consists of a preferably cylindrical transversal pin (120), with an intermediate round body in friction material (121), engaged in a transversal through-hole (122) obtained on the lower ends (49) of the secondary levers (10) or (10') and in a transversal through-hole (123) formed on the upper ends (8) of levers (6) or (6'), aligned to each other.

The pin (120) is inserted, or extracted, by hand, and its maintenance in position is guaranteed by the friction exercised on the walls of the hold (122) of the friction ring (121).

As it appears from the foregoing description, the connecting and intermediate means of support (9), for control levers (10) or (10') and (6) or (6'), with pantograph movement, are of simple structure, easy to construct and use and of very limited cost.

We claim:

1. A device for controlling the opening and closing of the roof (13) of a vehicle, said roof having first pins (12) fixed thereto, comprising a worm screw (1) having a vertical axis and two opposite sides, two helical gears (3), having parallel horizontal axes (4), and being coupled to said opposite sides of said worm screw, two primary levers (6,6'), each primary lever having one end in engagement with each gear, a second pin projecting at the other end of each primary lever, secondary levers (10,10') pivotally connected and supported at one end to said second pin, the other end of each of said secondary levers being connected to each of said first pin, said primary and secondary levers forming an articulated pantograph structure, said worm screw when rotating moving said structure and causing said primary levers to assume a horizontal position when said roof is closed and when said roof is completely opened, said primary and secondary levers are raised and aligned.

2. The device according to claim 1, wherein said worm screw (1) is controlled in rotation by means of a knob (2) or a reduction gear.

3. The device according to claim 1, wherein said primary levers (6,6') or secondary levers (10,10') comprise a hollow portion and said secondary levers are placed in the closing position in said hollow portion or said primary levers are placed in the closing position in the hollow portion of the secondary levers.

4. The device according to claim 3, wherein said primary levers, said secondary levers, said helical gears and said worm screw form an assembly, said assembly is contained in a container, said roof has a frame, said frame has an interior edge and said container is fixed to said interior edge.

5. The device according to claim 4, wherein said container has a base, said worm screw, said knob (2), said helical gears (3), and respective primary levers are placed in an intermediate bracket (24) provided with two third pins (25), positioned at the base of said container.

6. The device according to claim 5, wherein said primary levers (6') and said secondary levers (10') are constructed to follow the circumferential motion of said first pins.

7. The device accordingt to claim 1, wherein said secondary levers have internal seats (27), said primary levers or secondary levers are provided with coupling means with said second pins (9), said coupling means comprising third levers (29) rotating around supports (30) and provided with front wedge-shaped ends (31) and rear ends (32) with pressure springs (28) positioned in said seats (27).

8. A device for controlling the opening and closing of the roof (13) of a vehicle, said vehicle having first pins (12) fixed thereto, comprising a worm screw (1) having a vertical axis and two opposite sides, two helical gears (3) having parallel horizontal axes and being coupled to said opposite sides of said worm screw, two primary levers, each primary lever having one end in engagement with each gear, a pair of secondary levers forming a pantograph structure with said primary levers, each of said secondary levers have a lower end (49), each of said lower ends having an interior surface, said primary levers being formed by coupling a pair of arms in a horseshoe configuration, each of said arms having an upper end (8), said upper ends of said primary levers being insertable between the lower ends of said secondary levers, said primary levers the lower ends of said secondary levers, said primary levers and said secondary levers being connected to a support by means of two fourth lateral pins (40) projecting from said interior surfaces of the ends of said secondary levers, said fourth lateral pins engagin with through-holes in said upper ends of said arms.

9. A device for controlling the opening and closing of the roof (13) of a vehicle, said vehicle having first pins (12) fixed thereto, comprising a worm screw (1) having a vertical axis and two opposite sides, two helical gears (3) having parallel horizontal axes and being coupled to said opposite sides of said worm screw, wherein secondary levers and said primary levers are connected to a support by means of a first transversal pin (41), having a threaded edge (43), each of said secondary levers having an end, each of said primary levers having an end, said ends of said secondary levers being coupled with the ends of said primary levers, said ends of said secondary levers having a hollow portion, said hollow portion having a threaded ringnut and a guide slit, said first transversal pin engaging with said hollow portion, said primary levers having an upper part, said upper part having a first through-hole, said first through-hole being aligned with said hollow portion.

10. A device for controlling the opening and closing of the roof (13) of a vehicle, said vehicle having first pins (12) fixed thereto, comprising a worm screw (1) having a vertical axis and two opposite sides, two helical gears (3) having parallel horizontal axes and being coupled to said opposite sides of said worm screw, wherein each of said secondary levers have an end, each of said ends having a second transversal through-hole, each of said primary levers having an end, each of said ends having a third tranversal through-hole, said secondary levers and said primary levers being connected to a support by means of a second trasversal pin, said second transversal pin being provided with an intermediate ring made of friction material, said ring pressure-engaging with said second and third transversal through-holes, said through-holes being aligned to each other.

11. The device according to claim 8, wherein said arms of said primary levers are made of steel and fixed by electrowelding.

12. The device according to claim 9, wherein said ring nut (44) rotates around said transversal pin while remaining comprised in said guide slit.

13. The device according to claim 10, wherein said friction ring forms the restopping means of said transversal pin.

* * * * *